Sept. 6, 1927. 1,641,492
C. JASPERSON
POTATO PICKER, CLEANER, SORTER, AND BAGGER
Filed Dec. 19, 1923 3 Sheets-Sheet 1
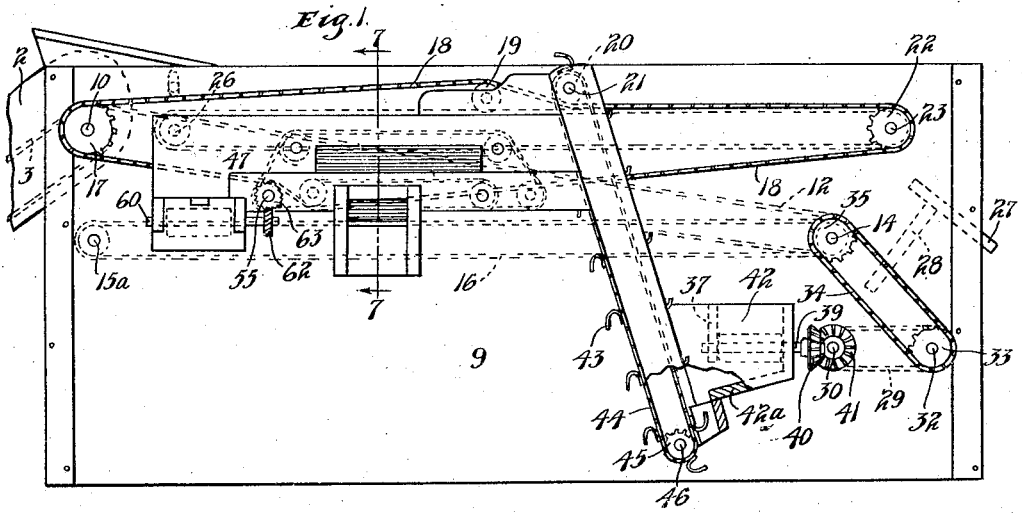
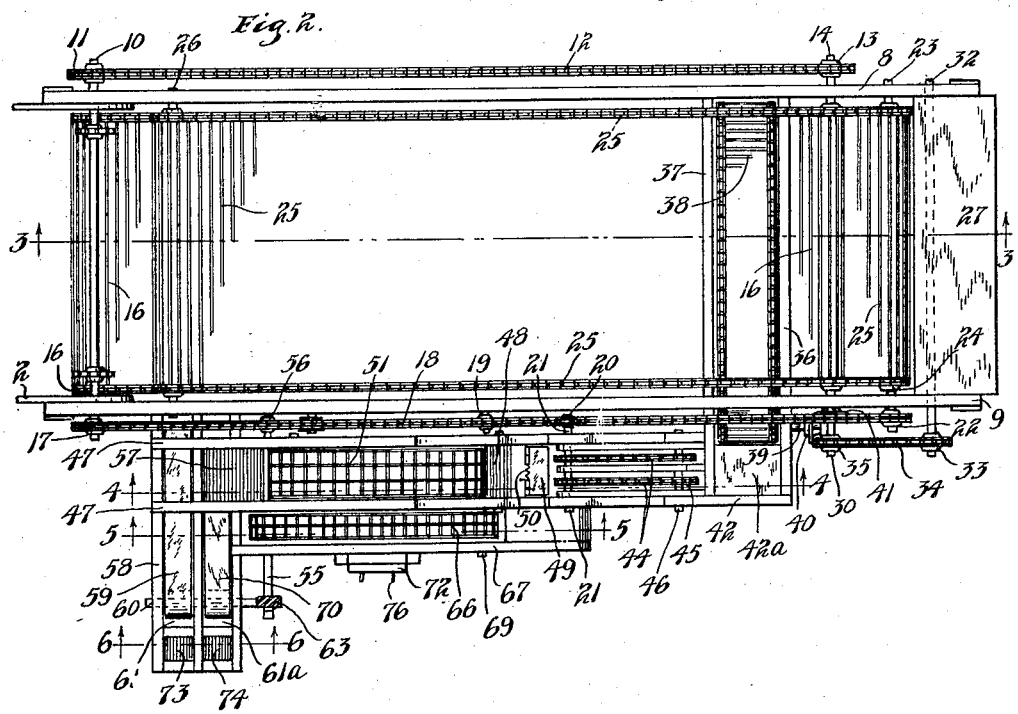
INVENTOR.
CHARLIE JASPERSON.
BY HIS ATTORNEY.

Sept. 6, 1927.

C. JASPERSON 1,641,492

POTATO PICKER, CLEANER, SORTER, AND BAGGER

Filed Dec. 19, 1923      3 Sheets-Sheet 2

INVENTOR.
CHARLIE JASPERSON
BY HIS ATTORNEY,
James F. Williamson

Sept. 6, 1927.  
C. JASPERSON  
1,641,492  
POTATO PICKER, CLEANER, SORTER, AND BAGGER  
Filed Dec. 19, 1923    3 Sheets-Sheet 3
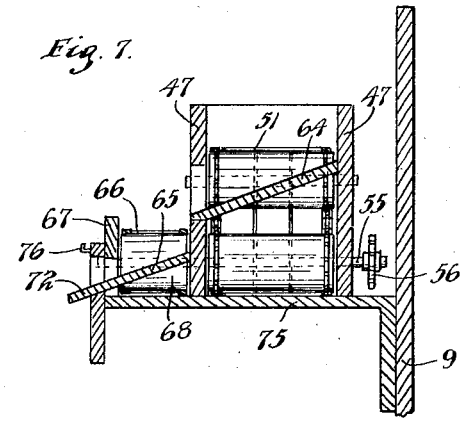
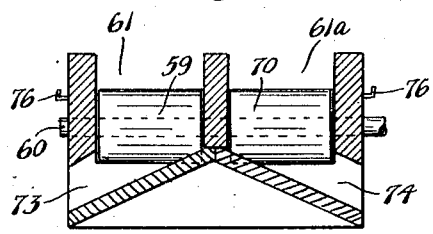
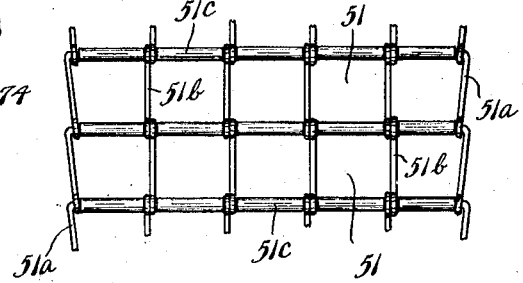
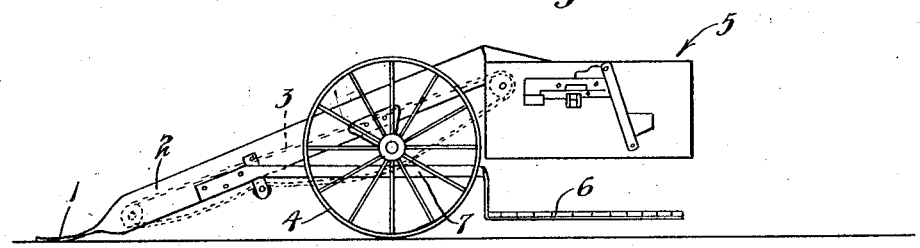
INVENTOR.  
CHARLIE JASPERSON.  
BY HIS ATTORNEY,  
James F. Williamson Patented Sept. 6, 1927.

1,641,492

UNITED STATES PATENT OFFICE.

CHARLIE JASPERSON, OF PRINCETON, MINNESOTA.

POTATO PICKER, CLEANER, SORTER, AND BAGGER.

Application filed December 19, 1923. Serial No. 681,497.

This invention relates to a potato cleaner, sorter and bagger and particularly to such a device adapted to be attached to an ordinary standard potato digger. The standard potato digger, as is well known, elevates both the vines and potatoes and also picks up quite a few stones which are also elevated and discharged with the vines and potatoes.

It is an object of this invention to provide a device which may readily be attached to the rear of a potato digger and which will comprise means for separating and discharging the vines, means for separating the stones from the potatoes, and means for receiving and sorting the potatoes, said potatoes being discharged through chutes where the same can readily be received into bags.

It is a further object of the invention to provide such a device and also to attach to the potato digger a platform on which a boy or operator may stand to manipulate the sacks into which the potatoes are delivered.

It is also an object of the invention to provide such an attachment as set forth comprising endless traveling carriers adapted, respectively, to receive the vines and potatoes, the carrier which receives the potatoes also receiving the stones which are elevated by the potato digger and discharging said stones and potatoes onto a chute by which they are deflected onto another endless carrier having a roller at one end whereby the stones will remain on the last mentioned carrier and be discharged and the potatoes will bounce from said last mentioned carrier and roller and be deflected onto another carrier from which they are delivered to the sorting means.

It is a further object of the invention to provide such a device, including sorting means, comprising an endless traveling screen, this traveling screen discharging into a delivery chute, which screen has a laterally directed chute beneath its top run which, in turn, delivers to another endless traveling screen of smaller mesh which also discharges into a delivery chute, said latter screen also having a laterally discharging chute beneath the top run thereof.

These and other objects and advantages of the invention will be fully set forth in the following description made in connection with the accompanying drawings in which like reference characters refer to the same parts throughout the different views, and in which, Fig. 1 is a view in side elevation of the device showing a portion of the digger, a part of the device being broken away and shown in vertical section;

Fig. 2 is a top plan view of the device;

Fig. 6 is a vertical section taken on the line 6—6 of Fig. 2, as indicated by the arrows;

Fig. 7 is a vertical section taken on the line 7—7 of Fig. 1, as indicated by the arrows;

Fig. 8 is a view in side elevation illustrating the relation of the device to the potato digger; and Fig. 9 is a partial plan view of a screen used.

Figure 3:
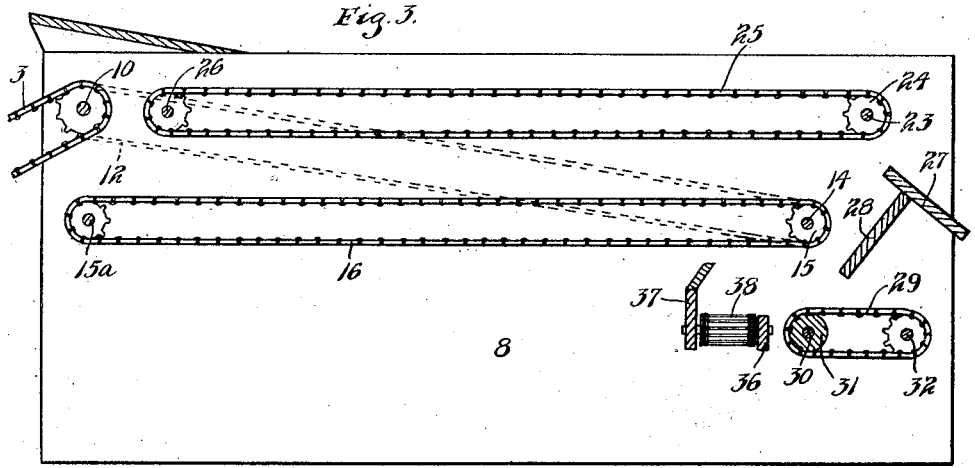
Fig. 3 is a longitudinal vertical section taken on the line 3—3 of Fig. 2, as indicated by the arrows.
Figure 4:
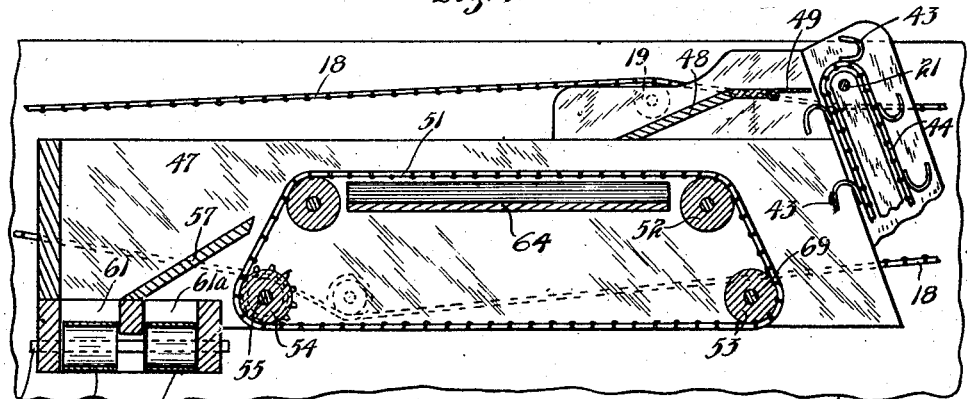
Fig. 4 is a vertical section taken on the line 4—4 of Fig. 2, as indicated by the arrows.
Figure 5:
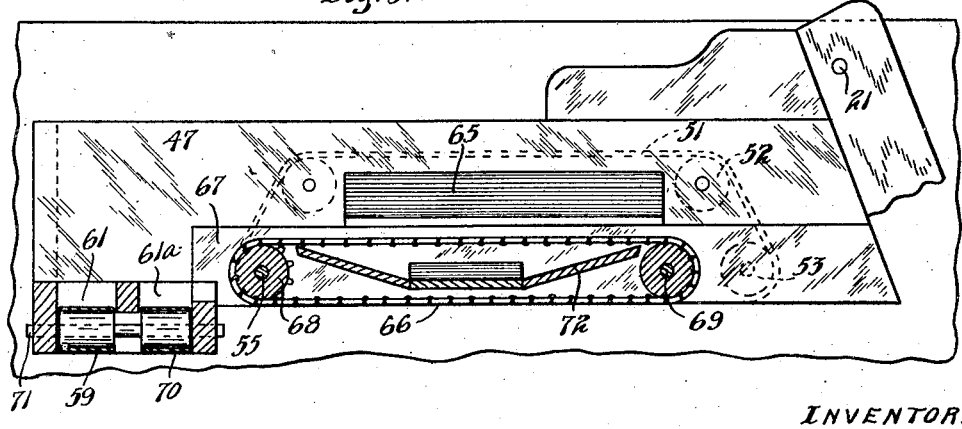
Fig. 5 is a vertical section taken on the line 5—5 of Fig. 2, as indicated by the arrows.

Referring to the drawings, particularly Fig. 8, a potato digger of standard form is illustrated comprising the digging blade 1, the upwardly extending trough 2 in which travels the endless conveyor 3, said trough and other parts being supported by the wheels 4.

In accordance with the present invention, an attachment is provided which, in the embodiment of the invention illustrated, is in the form of a substantially rectangular box or housing 5 which will be suitably secured to the upper and rear end of the trough 2. A platform 6 is provided adapted to be disposed close to the surface of the ground, which platform is supported from the frame of the potato digger and the trough 2 by means of a frame 7.

The member 5 has side walls 8 and 9 and said side walls are traversed at their front ends by a shaft 10 which will replace the shaft usually carrying the sprockets in the upper end of the digger elevator 3. The shaft 10 carries outside the exterior of side 8, a sprocket 11 over which the driving chain 12 passes to drive a sprocket 13 on a shaft 14, which shaft 14 also extends between and is journaled in the sides 8 and 9. The shaft 14, between the sides 8 and 9, carries the supporting and driving members 15 of an endless conveyor 16 extending between the sides 8 and 9 in a substantially horizontal plane having its front end disposed under the upper end of the digger conveyor 3, as shown in Fig. 3. This front end of conveyor 16 is supported upon rotating members secured to a shaft 15ª extending between and journaled in the sides 8 and 9. A sprocket wheel 17 is secured to shaft 10 at the exterior of side 9 and a chain 18 is driven by said sprocket and passes therefrom over a roller 19 carried on a shaft secured and projecting from the side 9 and then around a sprocket 20 secured to a shaft 21 to be later described. Chain 18 then passes around the sprocket 22, secured to a shaft 23 journaled in and extending between the sides 8 and 9 which shaft carries the supporting and driving members 24 of an endless conveyor 25 supported at its other end on members carried by a shaft 26 extending between and journaled in the sides 8 and 9.

The conveyor 25 is adapted to discharge at its rear end onto a chute 27 projecting at the rear end of member 5. The conveyor 16 discharges onto an inwardly directed chute 28 beneath the lower end of which is an endless conveyor 29 having, at its forward end, a roller 30 carried on a shaft 31 extending between and journaled in the sides 8 and 9 between which sides the conveyor 29 also extends. The rear end of the conveyor 29 is carried on supporting and driving members secured to a shaft 32 which also is carried in and extends between the sides 8 and 9 and projects beyond said latter side where it has secured thereto a sprocket 33 driven by a chain 34 passing over a sprocket 35 secured to the projecting end of shaft 14. Extending between a trough side 36 and a higher side 37 which extend transversely of the sides 8 and 9, is an endless conveyor 38 adapted to travel substantially at right angles to the conveyors 25 and 16 and said conveyor and its side 36 are disposed substantially level with and adjacent the roller 30. The conveyor 38 is carried on members secured to shafts extending between and journaled in the sides 36 and 37, one of which shafts is shown as 39 and has secured thereto a beveled gear 40 driven by a beveled gear 41 secured to shaft 30 closely adjacent the side 9.

The conveyor 38 extends between the sides 8 and 9 and through an opening in side 9 and discharges into a hopper 42 extending at the exterior of the side 9, which hopper has a downwardly and forwardly directed bottom 42ª adjacent the edge of which travel the buckets 43 of an endless conveyor 44 comprising a pair of chains driven by sprockets 45 secured to a shaft 46 extending between and journaled in the parallel sides 47 of a trough extending parallel and adjacent the side 9. The chains of conveyor 44 are driven by sprockets secured to the shaft 21 already referred to, which is driven by a sprocket 20 through chain 18, which shaft 21 is also journaled in and extends between the sides 47.

The conveyor 44 and its buckets 43 travel upwardly and forwardly to a point adjacent the top of the side 9 and said buckets are adapted to deliver to a chute 48 extending between the sides 47, the end of said chute adjacent said conveyor 44 being provided with a yieldingly held hinged door 49 which is depressed as each bucket passes the same. Said door is normally held in its horizontal position by a spring 50 secured to its hinge pintle.

The chute 48 discharges onto an endless traveling screen 51 of comparatively large mesh, running over rollers 52 carried on shafts journaled in the sides 47 and also running over sprockets 53 and 54, members 54 forming driving sprockets for said screen and being carried on a shaft 55 projecting adjacent the side 9 where it has secured thereto a sprocket 56 which is engaged by the lower run of chain 18, as shown in Figs. 1 and 2. Screen 51 comprises transverse rods 51ª having downwardly bent ends with eyes embracing the adjacent rods, and spaced links 51ᵇ pivotally connect rods 51ª being spaced by sleeves 51ᶜ surrounding said rods. The upper run of the screen 51 delivers to a chute 57 at its forward end adapted to direct material into a trough 58 in which travels an endless belt 59 supported by rollers at its outer end secured to a shaft 60 journaled in the sides of trough 58 and a trough 61 adjacent the same. Said shaft 60 projects beyond trough 61 where it has secured thereto a spiral gear 62 which is engaged and driven by another spiral gear 63 disposed thereover and secured to the projecting end of the shaft 55. Disposed beneath the top run of screen 51 is an outwardly directed chute 64 which delivers through an opening 65 in the side 47 onto the top of an endless screen 66, which screen is of smaller mesh than screen 51 and extends longitudinally between the outer side 47 and another side or wall 67, being supported and driven by a member 68 secured to shaft 55 and carried at its rear end on a member secured to a shaft 69 journaled in sides 67 and 47. The top run of screen 66 discharges at its forward end into the top 61ª in which a conveyor belt 70 travels, being carried on a roller secured to shaft 60. Said belts 59 and 70 are carried on members at their inner ends supported on shaft 71 journaled in the sides of troughs 61 and 61ª. The screen 66 has disposed beneath its top run a laterally directed chute 72 which discharges through an opening in the side of the wall 67. The troughs 61 and 61ª have downwardly directed chutes 73 and 74, respectively, at their outer ends, as shown in Figs. 2 and 6. The sides 47 and 67 and the troughs 60 and 61 are supported by one or more angle brackets 75 secured to the outer side or wall 9.

In operation, the member 5 and its attached parts will be carried and progressed with the potato digger. As the vines, potatoes and stones are carried upwardly on the conveyor 3, they will be carried to the top thereof and the vines which are of considerable size and comparatively light will be discharged onto the conveyor 25 and will be carried thereby to the rear of member 5 and discharged on chute 27, from which they will pass out of the machine. The potatoes and stones carried up by the conveyor 3 will drop between the same and conveyor 25 and onto conveyor 16. These stones and potatoes will be carried rearwardly by conveyor 16 and discharged onto the chute 28. The stones will slide down chute 28 onto conveyor 29 and will be conveyed rearwardly thereby and discharged from the machine. The potatoes, however, will strike upon the top of the front end of said conveyor. This end of the conveyor is quite solid, being supported by the solid roller 30. The potatoes being elastic, will bounce off of the conveyor and its underlying roller and will be deflected toward conveyor 38. The upstanding side 37 will prevent any of the potatoes jumping over the conveyor 38. The conveyor 38 is sufficiently close to conveyor 29 to receive all of the potatoes. The potatoes are thus separated from the stones and are carried transversely across the member 5 from the wall 8 to and through the wall or side 9 and discharged into the hopper 42. The potatoes slide down the bottom 42ª of hopper 42 and are received in the buckets 43 on the upwardly traveling side of the conveyor 44, then are carried by said conveyor and discharged onto chute 48. The hinged plate or door 49 prevents any of the potatoes from dropping downwardly at the descending side of the conveyor 44, as said door normally is in its horizontal position. The potatoes now roll down chute 48 and are discharged onto the larger mesh screen 51. Any stones which might not be separated will lie on and drop through door 49 when it is moved downward by the buckets. The smaller potatoes will drop through this screen and the larger potatoes will be carried therealong and be discharged into chute 57 from whence they will pass into trough 61 onto conveyor 59 and will drop into the discharge chute 73. Potatoes of smaller size dropping through screen 51 will be directed by chute 64 laterally through the outer side 47 onto the traveling screen 66. The potatoes which are quite small will pass through this screen but most of the potatoes will be carried therewith and discharged into trough 61ª on the conveyor 70 from which they will be dropped into discharge chute 74. The smallest potatoes dropping through screen 66 will be directed laterally by chute 72 out at one side of the wall 67. The operator, which may be a boy, will stand upon the platform 6 and will manipulate sacks which will be placed over the discharge chutes 72, 73 and 74 so that potatoes discharged will fall into said sacks. Said chutes may, if desired, be provided with sack-holding means 76 on which the sacks or other sack-holding frames may be hung so that the sacks will be supported as the potatoes are discharged therein.

From the above description it is seen that applicant has provided a simple and efficient device for receiving the potatoes from the conveyor of the potato digger, separating the vines therefrom, separating the stones from the potatoes and then sorting the potatoes and discharging the same into bags or sacks. The parts of the device are driven from the potato digger and the action of the device is continuous as the digging operation progresses. The arduous labor of picking the potatoes from the ground, and transportation to the sorting means is thus eliminated and all of these operations are performed at one time and continuously. The device can be attached to practically any standard potato digger and will have high utility for the purpose intended.

It will, of course, be understood, that various changes may be made in the form, details, arrangement and proportions of the parts without departing from the scope of applicant's invention, which, generally stated, consists in the matter shown and described and set forth in the appended claims.

What is claimed is:

1. A potato handling device adapted to be attached to a standard potato digger and to receive the vines, potatoes and stones discharged therefrom, comprising an endless carrier for reciving the vines and discharging the same, an endless carrier below said carrier for receiving the potatoes and stones, means for separating said stones from the potatoes, an endless carrier traveling substantially at right angles to said first mentioned carrier adapted to receive said potatoes, an upwardly extending carrier traveling at the side of and parallel to said first mentioned carrier receiving the potatoes from the last mentioned carrier, a screen to which said potatoes are delivered by said upwardly extending carrier, a chute beneath said screen, another screen of smaller mesh to which said chute delivers, said screens discharging potatoes passing thereover into delivery chutes.

2. A potato cleaning, separating and sorting device having in combination an elevating means, a conveyor spaced from the elevating means and adapted to receive the potato vines therefrom, a conveyor having its receiving end disposed below said elevating means and first mentioned conveyor and the space therebetween so as to receive potatoes, stones and clods dropping through said space, a chute to which said last mentioned conveyor delivers, a conveyor beneath said chute on which the clods, stones and potatoes are discharged and which is adapted to carry and discharge the clods and a large percentage of stones, a carrier adjacent said last mentioned conveyor and moving at right angles thereto onto which the potatoes bounce from said last mentioned conveyor, and a potato sorting means to which said carrier delivers.

3. A potato cleaning, separating and sorting machine having in combination means for separating potatoes from the relatively small foreign material mixed therewith, a hopper for collecting said cleaned potatoes, an elevator receiving from said means and provided with a plurality of units each adapted to receive and remove a single potato or stone from said hopper and a hinged platform adapted to receive said picked potato or stone and operative to guide said potatoes thereover and to swing to remove said stones and heavier material.

4. A potato cleaning and separating and sorting device having in combination an endless elevator, a longitudinally traveling endless conveyor having its receiving end spaced from said elevator and adapted to receive and discharge the vines, a longitudinally traveling conveyor having its receiving end disposed beneath the end of the elevating means of the digger and the space between the same and said conveyor adapted to receive the potatoes, clods and stones from said elevating means, a chute to which said last mentioned conveyor discharges, a longitudinally moving endless conveyor having a roller at its receiving end, which end and roller are disposed beneath said chute, said last mentioned conveyor being adapted to receive the clods and most of the stones from said chute and to discharge the same, a carrier spaced from and extending along said last mentioned conveyor adapted to receive the potatoes which bounce from the receiving end of said last mentioned conveyor and said roller, and a potato sorting and delivering means to which said carrier delivers.

5. In a device of the class described, an inclined chute adapted to receive potatoes mingled with hard clods and stones, a carrier spaced a relatively short distance from a point directly below said chute and a second carrier having a portion thereof interposed between said first mentioned carrier and the lower end of said chute, whereby the potatoes and other resilient material will strike said second mentioned conveyor and bounce therefrom to said first mentioned conveyor, and whereby said clods and a large proportion of said stones will remain on said second mentioned carrier and be removed.

6. In a device of the class described, a chute adapted to receive potatoes mingled with hard clods and stones, a carrier having an end thereof disposed directly beneath said chute to receive and remove the clods and a large percentage of the stones and a second carrier disposed forwardly of said chute and adjacent said end of said first mentioned carrier onto which the potatoes and other elastic material will bounce after striking said first mentioned carrier.

In testimony whereof I affix my signature.

CHARLIE JASPERSON.